United States Patent Office 3,248,168
Patented Apr. 26, 1966

3,248,168
METASTABLE COORDINATION COMPLEXES OF AZIDES WITH CERTAIN HYDRIDES
George N. Tyson, Jr., Claremont, Calif., assignor to Olin Mathieson Chemical Corporation, a corporation of Virginia
No Drawing. Filed Apr. 14, 1959, Ser. No. 806,383
6 Claims. (Cl. 23—14)

This invention relates to new chemical compounds which are metastable coordination complexes of azides with hydrides, the said complexes having from one to four of the linkages —$N_3$:E— where E is an electron deficient element of a hydride of boron, aluminum or gallium or a hydrocarbon substituted boron hydride.

The new compounds are obtained by reacting the azide with the hydride under relatively mild conditions of temperature and pressure, preferably below room temperature at atmospheric pressure or slightly above and in the presence of a solvent or dispersant. The compounds are formed by coordination or sharing of an electron pair from an azide nitrogen with the electron deficient element of the hydride.

The azides which can be employed include the lower alkyl azides, such as methyl azide, ethyl azide and propyl azide; isocyanogen tetraazide; metal azides of the class $$M[H_x(N_3)_y]_z$$

wherein M is an alkali metal, an alkaline earth metal, magnesium, beryllium, gallium or aluminum, $x$ is 0 to 2, $y$ is 1 to 3, and $x+y=1$ to $3=z$, the valence of the metal M, such as sodium, potassium and lithium azides, calcium, barium, magnesium and beryllium azides, aluminum and gallium azides; or of the class $$M[BH_a(N_3)_b]_c$$

wherein M has the previous significance, $a$ is 0 to 3, $b$ is 1 to 4, $a+b=4$, and $c$ is 1 to 3, the valences of the metal M, such as sodium, potassium and lithium boroazides and borohydridoazides, calcium, barium, magnesium and beryllium boroazides and borohydridoazides, aluminum and gallium boroazides and borohydridoazides; or of the class $$M[AlH_a(N_3)_b]_c$$

wherein M, $a$, $b$, $c$ and $a+b$ have the previous significance, such as sodium, potassium and lithium aluminoazides and aluminohydridoazides, calcium, magnesium and beryllium aluminoazides and aluminohydridoazides, or of the class;

$$M[GaH_a(N_3)_b]_c$$

wherein M, $a$, $b$, $c$ and $a+b$ have the previous significance, such as sodium, potassium and lithium galloazides and gallohydridoazides, calcium and magnesium galloazides and gallohydridoazides, and aluminum galloazide and aluminum gallohydridoazides, and methyl aluminum diazides.

The alkali metal and alkaline earth metal azides can be prepared by conventional methods such as reaction of alkali metal or alkaline earth metal hydrides, chlorides or sulfates with hydrazoic acid. Magnesium, beryllium, aluminum and gallium azides can be prepared by reaction of the corresponding hydrides with hydrazoic acid generally according to the procedures described by E. Wiberg and H. Michand in "Z. Naturforsch," vol. 9b, pages 495–503 (1954). The boroazides and borohydridoazides, the aluminoazides and aluminohydridoazides, and the the galloazides and gallohydridoazides can also be prepared by reaction of the corresponding metal borohydrides, metal aluminum hydrides and metal gallium hydrides with hydrazoic acid generally according to the procedures described by Wiberg and Michand in the above publication.

The hydridoazides can be prepared by employing less than the stoichiometric amount of hydroazoic acid. Another metal azide which can be employed is that obtained by reacting hydrazoic acid with $Al_2B_4H_{18}$. The latter compound is formed together with diborane by moderate heating of aluminum borohydride as described by R. A. Ogg, Jr., and J. D. Ray in "Discussions of the Farraday Society," No. 19, 239–46 (1955). Isocyanogen tetrazide, $C_2N_{14}$, melting point 89° C., can be prepared, for example, by the reaction of isocyanogen tetrabromide in acetone or absolute ethanol with sodium azide (activated by rubbing with a trace of $N_2H_4 \cdot H_2O$ and precipitated from a little water with acetone) in water at 0° C. with stirring.

The boron, aluminum or gallium hydrides which can be employed are diborane, tetraborane, pentaborane-9, dihydropentaborane ($B_5H_{11}$), decaborane, aluminum hydride etherate, polymeric aluminum hydride, and gallium hydride, digallane. The hydrocarbon substituted boron hydrides include alkyl boranes such as trimethyl borane, triethylborane and diethyl methyl borane; the reaction products of diborane with ethylene disclosed in application Serial No. 540,140 filed October 12, 1955, now Patent No. 3,198,838, of Weilmuenster et al.; the reaction products of diborane with acetylene disclosed in application Serial No. 514,122 filed June 8, 1955, now Patent No. 3,159,681, of Stange et al.; the reaction products of diborane with 3 to 5 carbon atom acetylenes or dienes disclosed in application Serial No. 533,944, filed September 13, 1955, of Weilmuenster et al.; monoethyltetraborane disclosed in application Serial No. 505,706, filed May 3, 1955, of Faust et al.; monoalkyl pentaboranes such as monomethylpentaborane-9, monoethylpentaborane-9, mono-n-propylpentaborane-9 disclosed in application Serial No. 497,408, filed March 28, 1955, of Altwicker et al. and application Serial No. 501,742 filed April 15, 1955, of Chiras et al.; dialkylpentaboranes such as diethylpentaborane-9 disclosed in application Serial No. 540,145, filed Oct. 12, 1955, now abandoned, of Paustian et al.; the mono- di- and trialkyldecarboranes such as monomethyldecaborane, dimethyldecaborane, ethyldecaborane, diethyldecaborane, triethyldecaborane disclosed in application Serial No. 497,407, filed March 28, 1955, of Altwicker et al.; reaction products of acetylenic hydrocarbons with decaborane and alkyldecaboranes such as those disclosed in application Serial No. 741,976, filed June 13, 1958, now abandoned, of Ager, Jr.; et al., and application Serial No. 779,788, filed December 11, 1958, now Patent No. 3,092,664, of Clark et al.

The following examples illustrate in detail the preparation of the compounds of this invention. In the examples all references to "moles" are to "gram-moles."

*Example I*

2.2 grames (0.01 mole) of isocyanogen tetraazide, $C_2N_{14}$, prepared by the reaction of isocyanogen tetrabromide in acetone with sodium azide (activated by rubbing with a trace of $N_2H_4 \cdot H_2O$ and precipitated from a little water with acetone) in water at 0° C. with stirring, is dissolved in 1 liter of completely anhydrous diethyl ether at room temperature in a closed vessel which is then swept with nitrogen gas. The resulting solution is then cooled to −80° C. Diborane, 1.38 grams (0.05 mole), is slowly bubbled into this cooled solution. The system is allowed to warm to 0° C. and the ether and excess diborane are removed by evacuation of the system. A salt-like solid remains which is $C_2N_{14}:(BH_3)_4$.

Example II

Lithium boroazide $LiB(N_3)_4$, 0.01 mole, is dissolved in 1 liter of completely anhydrous diethyl ether at room temperature in a closed vessel which is then swept with nitrogen. The resulting solution is then cooled to 0° C. and 0.045 mole of pentaborane-9 is introduced slowly with stirring. Stirring is continued for one hour, the system is allowed to warm to 10° C. and the ether and excess pentaborane-9 are removed by vacuum pumping. A solid remains which is $LiB(N_3)_4:(B_5H_9)_4$.

Example III

Sodium azide, 0.01 mole, is dissolved in 500 cc. of anhydrous diethyl ether and the solution is cooled to −10° C. Aluminum hydride, 0.01 mole, in 500 cc. of diethyl ether, also cooled to −10° C., is cautiously added with stirring at −10° C. under a nitrogen atmosphere. After 1 hour, the system is allowed to warm to 0° C. and the ether is removed by vacuum pumping. A solid remains which is $NaN_3:AlH_3$.

Example IV

Sodium trihydridoboroazide $NaH_3BN_3$, 0.01 mole, is prepared by admixing 0.01 mole of sodium borohydride in a frozen diethyl ether solution with 0.01 mole of hydrazoic acid and allowing the mixture to thaw and stand at room temperature for 2 hours. The system is then cooled to 0° C. and, under a nitrogen atmosphere, 0.01 mole of ethyldecaborane is added cautiously with stirring over a period of 2 hours. The system is then allowed to warm to room temperature and the ether is pumped off. A solid remains which is

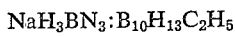

$$NaH_3BN_3:B_{10}H_{13}C_2H_5$$

Example V 0.01 mole of sodium aluminoazide, $NaAl(N_3)_4$ dissolved in 1 liter of anhydrous ethyl ether is cooled to −10° C. Triethylborane, 0.04 mole, is added slowly with stirring under an atmosphere of nitrogen. The system is then allowed to warm to 5° C. and the ether is removed by vacuum pumping. A solid remains which is $NaAl[(N_3):B(C_2H_5)_3]_4$.

In addition to the diethyl ether employed in the specific examples, other solvents and/or dispersants can be employed as the reaction medium. These include lower alkyl ethers such as dimethyl ether, methyl ethyl ether, di-n-propyl ether, diisopropyl ether, and the like, dioxane, tetrahydrofuran, aliphatic hydrocarbons such as n-pentane, n-hexane, and n-heptane; cycloaliphatic hydrocarbons such as methylcyclopentane and cyclohexane; and aromatic hydrocarbon solvents such as benzene, toluene and xylene. Similarly the reaction conditions of temperature and pressure can vary, generally being within the range of about −50° to 30° C., preferably −15° to 5° C., and subatmospheric to about 2 or 3 atmospheres. The reactant proportions are generally approximately stoichiometric or slightly in excess of stoichiometric with respect to the metal hydride. The mole ratio of solvent or dispersant to the azide is generally within the range from about 100 to 1500:1, preferably 800 to 1500:1.

The solid products of this invention can be employed as monopropellants suitable for rocket power plants and other jet propelled devices. Such monopropellants burn with high flame speeds, have high heats of combustion and are of the high specific impulse type. In formulating a solid monopropellant composition employing one of the compounds of this invention, care must be exercised to avoid shock and temperatures above about 50° C. Hence where binders are employed to give the propellant mechanical strength, they are of the slow setting type which set or polymerize at low temperatures. Suitable binders include styrene and methyl methacrylate syrups and, employing these, the polymerization is carried out preferably below room temperature with cooling and in the presence of a retarder to control the rate of polymerization and avoid undue temperature rise with the formation of hot spots. The amount of binder employed is generally about 5% to 10% by weight or somewhat less based upon the weight of the final propellant. If the propellant is extruded, the pressure and temperature must be kept relatively low. Preferably the propellant is cast into the desired shape.

In operation of a rocket engine employing a monopropellant of this invention, start-up is best accomplished by means of a pyrotechnic igniter or a flame lance.

I claim:

1. A class of new chemical compounds which are metastable coordination complexes of azides with hydrides, the said complexes having from one to four of the linkages —$N_3:E$— where E is an electron deficient element of a hydride selected from the group consisting of an aluminum hydride, a gallium hydride, a boron hydride, and an aliphatic hydrocarbon substituted boron hydride wherein the hydrocarbon substituent has from 1 to 10 carbon atoms, the azide being selected from the group consisting of lower alkyl azides; isocyanogen tetraazide; methyl aluminum diazide; metal azides of the class $$M[H_x(N_3)_y]_z$$

wherein M is selected from the class consisting of an alkali metal, an alkaline earth metal, magnesium, beryllium, gallium and aluminum, $x$ is 0 to 2, $y$ is 1 to 3, and $x+y=z$, the valence of the metal M; metal azides of the class $$M[BH_a(N_3)_b]_c$$

wherein M has the previous significance, $a$ is 0 to 3, $b$ is 1 to 4, $a+b=4$, and $c$ is 1 to 3, the valence of the metal M; metal azides of the class $$M[AlH_a(N_3)_b]_c$$

wherein M, $a$, $b$, $c$ and $a+b$ have the previous significance, and metal azides of the class $$M[GaH_a(N_3)_b]_c$$

wherein M, $a$, $b$, $c$, and $a+b$ have the previous significance.

2. 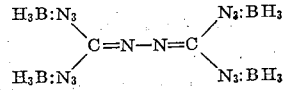

3. $LiB(N_3)_4:(B_5H_9)_4$
4. $NaN_3:AlH_3$
5. $NaH_3BN_3:B_{10}H_{13}C_2H_5$
6. $NaAl[(N_3):B(C_2H_5)_3]_4$

No references cited.

BENJAMIN HENKIN, *Primary Examiner.*

ROGER L. CAMPBELL, LEON D. ROSDOL, CARL D. QUARFORTH, *Examiners.*